H. T. AYDELOTT.
AUTOMATIC TRACK SANDER.
APPLICATION FILED MAY 14, 1912.

1,087,421.

Patented Feb. 17, 1914.

Witnesses

Inventor
Halstead T. Aydelott
By
Attorney ions_

UNITED STATES PATENT OFFICE.

HALSTEAD T. AYDELOTT, OF BIRMINGHAM, ALABAMA.

AUTOMATIC TRACK-SANDER.

1,087,421.  Specification of Letters Patent.  Patented Feb. 17, 1914.

Application filed May 14, 1912. Serial No. 697,341.

*To all whom it may concern:*

Be it known that I, HALSTEAD T. AYDE-LOTT, citizen of the United States of America, residing at Birmingham, in the county of Jefferson and State of Alabama, have invented certain new and useful Improvements in Automatic Track-Sanders, of which the following is a specification.

My invention relates to an improvement in an apparatus for use in connection with the standard air brake equipment and is designed to automatically deliver sand to the rails whenever the automatic brake valve is moved to set the air brakes, or when the valve stands in the positions known as "lap", "service" or "emergency".

My invention contemplates the utilization of an air pressure controlled valve to admit air from the main reservoir to a pipe line leading to the sand trap when the brakes are applied, this pipe line being connected to the main reservoir so that it draws its supply of air directly therefrom and without affecting the operation of the air brake system under control of the automatic brake valve and without increasing the duty on the triple or distributing valve.

In its preferred embodiment, the valve controlling the flow of air from the main reservoir to the sand trap will be closed responsive to the air pressure on its operating diaphragm or piston, which pressure on one side is directly under control of the automatic brake valve. This type of apparatus is best adapted for use with the Westinghouse " E T " type of air brake equipment.

A modification of my invention, which is generally available for all types of air brake equipment, consists in utilizing valve apparatus similar to the automatic feed valve of the Westinghouse air brake system and operating the regulating valve therein by a diaphragm or piston which is exposed on one side to the brake cylinder line pressure and controlled thereby while the main supply valve of the fitting controls the flow of air from the main reservoir to the sand trap. In both cases the apparatus responds automatically to a drop in pressure in the air brake system, designed to apply the brakes, to deliver air from the main reservoir to the sand trap without in any manner interfering with the operation or adjustment of the air brake system.

I have illustrated my invention in its preferred embodiments in the accompanying drawings, in which:—

Figure 1:
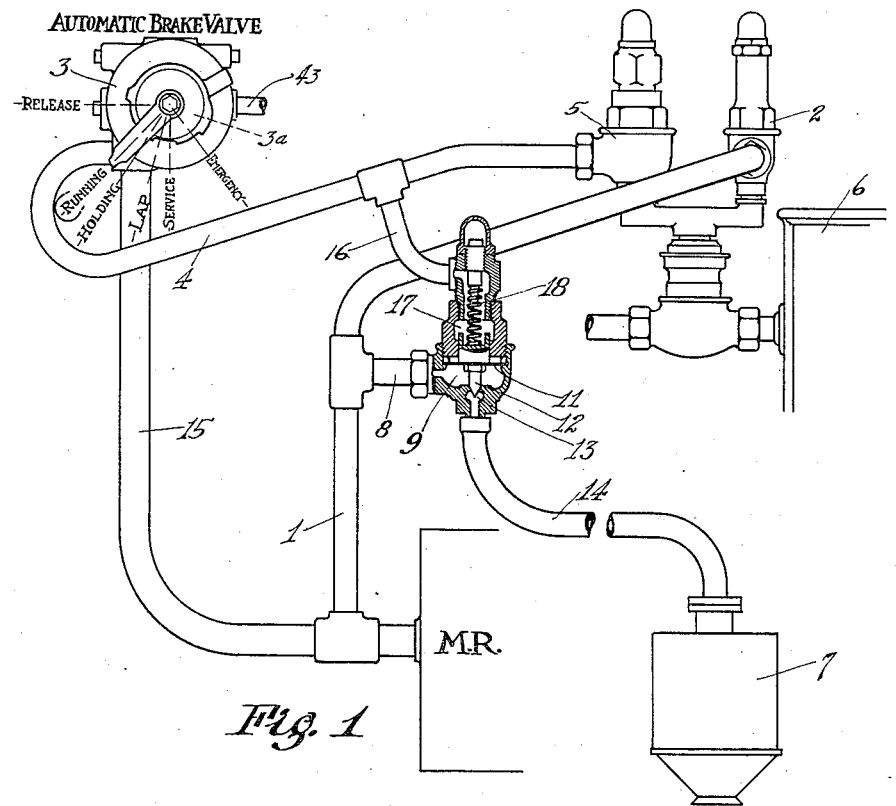
Figure 2:
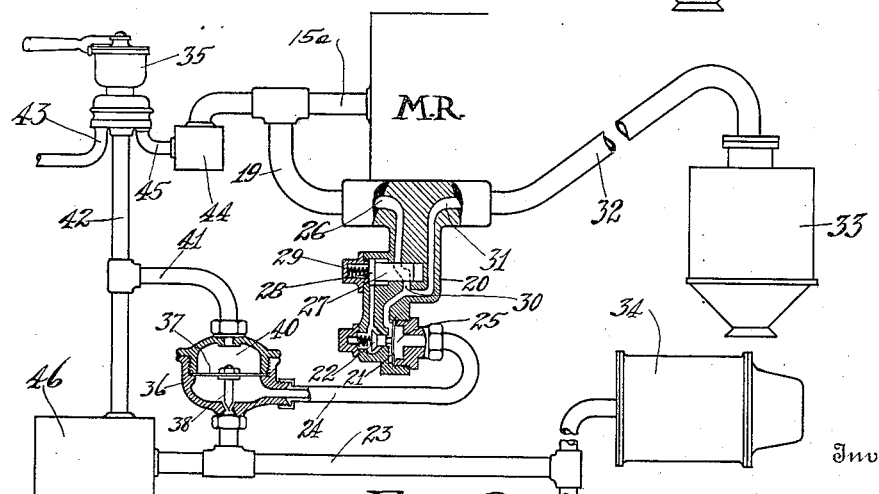

Figure 1 shows the mechanism which controls the sand feed valve directly connected to and controlled by the automatic brake valve. Fig. 2 shows a different form of valve mechanism which is connected to and controlled by the pressure in the brake cylinder line.

Similar reference numerals refer to similar parts throughout the drawings.

In the preferred embodiment of my invention as particularly adapted for use with the latest "E T" type of Westinghouse air brake equipment, the main reservoir M. R., is connected by a pipe 1 with the pump governor 2, and the automatic brake valve casing 3 has a pipe 4 connected with the pump governor 5. The pump governor mechanism controls the admission of steam to the pump cylinder 6, all in accordance with the present standard Westinghouse air brake equipment.

It being my purpose to utilize air from the main reservoir to blow sand from the sand trap 7, I provide a coupling in the pipe 1 and connect therein a pipe 8 which enters a valve chamber in the controller valve fitting 9. The valve fitting may be similar to fitting 5 of the pump governor and comprises a diaphragm 11 above the chamber to which is connected a pin valve 12 which controls the admission of the main reservoir air from pipe 8 through a port 13 to a pipe 14 leading to the sand trap. The main reservoir pressure which flows through pipe 15 to the automatic brake valve casing 3 is admitted by the automatic brake valve 3ª when in its "released", "running" or "holding" positions into the pipe 4, which is provided with a T-fitting from which a pipe 16 leads to a chamber 17 in the upper end of the fitting 9 above the diaphragm. A spring 18 urges the diaphragm to its lowered or valve closed position when the pressures are equalized on the diaphragm and interrupts the flow of air to the sand trap. When the automatic brake valve stands in its other positions, namely, "lap", "service" or "emergency", it cuts off air pressure from the pipes 4 and 16. When this occurs pressure falls above the diaphragm 11 and the pin valve 12 opens admitting air to the pipe 14 and the sand trap 7. Thus, whenever the brakes are applied, the main reservoir air is utilized to operate the sander and there is no interference with the control of the brake system by the engineer, and when the brakes are released the sander is cut out of service.

Obviously, the pipes 1 and 4 may lead directly to the valve fitting 9 if the pump governor is dispensed with and the pipe 4 may be connected up to the automatic brake valve in any manner which will cause the latter to equalize the pressures on the diaphragm 11 when the brakes are released and drop the pressure above the diaphragm 11 when the brakes are applied.

It is understood that the type of valve fitting 9 and the connections selected are those well adapted to carry out my invention, but I do not desire to limit myself to the same as various types of valve mechanism may be used to give the same novel operation which I claim as the gist of my invention.

Inasmuch as the preferred embodiment heretofore described is more particularly applicable for use with the Westinghouse "E T" type of air brake equiment, I have illustrated in Fig. 2 a modification of my invention which is more generally applicable to different types of air brake equiment. In this construction the main reservoir air pressure flows from pipe 15ª through pipe 19 to the controller valve fitting 20. This fitting is similar to the feed valve of the air brake equipment with the exception that the diaphragm 21, which operates the regulating valve 22, is exposed on the side away from the valve to the pressure in the brake cylinder line 23. A pipe 24 connects the brake cylinder line with an air chamber fitting 25 which screws against and holds the diaphragm in position. The main reservoir air enters the fitting 20 through a port 26 leading to the chamber for the supply valve 27 and tends to force the supply valve piston 28 to the left against the action of a spring 29, causing the supply valve to open a port 30 and admit the main reservoir air through a port 31 to a pipe 32 which leads to the sander 33. A small port (not shown) in the piston 28 permits the main reservoir air to flow through suitable ports to the chamber of the valve 22. In applying the brakes the air pressure in the brake cylinders 34 and in the brake cylinder line 23 will be built up and will move diaphragm 21 to open valve 22, thereby exhausting pressure from above the piston 28 and permitting it to open the supply valve and permit air to flow to the sander. As soon as the brakes are released the air pressure drops in the brake cylinder line and the valve 22 seats, whereupon the pressures will become balanced on the piston 28 and its spring will close it, shutting off air from the sander. The fundamental idea in this construction is the utilization of the brake cylinder line pressure to open or close the supply valve which admits main reservoir air to the blower line of the sander. The valve construction may be modified and if desired pistons may be substituted for the diaphragms disclosed in both automatic valve fittings 9 and 20.

I have found in practice that each sanding apparatus works automatically and promptly, supplying sand during application of the brakes by the automatic brake valve and leaving same on the track for starting purposes, and that by utilizing the main reservoir air the engineer does not lose in the slightest degree the control over his air brake system.

In order to prevent the sand being applied when the independent brake valve 35 is operated, I interpose in the pipe 24 a fitting 36 containing a diaphragm 37 to which is connected a pin valve 38, which, when closed, acts to shut off brake cylinder air from the chamber 25. The chamber 40 above the diaphragm is connected by a pipe 41 with the pipe line 42 which leads from the distributing valve 46, which is formally illustrated, to the independent brake valve which is connected through a pipe 43 with the automatic brake valve. The air pressure from the main reservoir flows to the independent valve from pipe 15ª through a reducing valve 44 and pipe 45. By this arrangement, when the independent brake valve is used, it admits air pressure through pipe 41 above the diaphragm and shuts off the brake cylinder line air from the chamber 25, thereby preventing the sander from going into operation. When, however, the independent valve is not in use, the air is exhausted from the chamber 40 through pipe 43 to the automatic brake valve which leaves the chamber 25 exposed to the cylinder line pressure.

Having thus described my invention, what I claim as new and desire to secure by Letters Patent, is:—

1. In an automatic track sanding apparatus, the combination with an air brake system comprising a main reservoir, an automatic brake valve, a distributing valve and pipe means to connect said parts, of an air operated sander, a pipe line connecting the main reservoir directly to the sander to deliver air to it from a source unaffected by the action of said valves, a valve in the sander line, and means, responsive to the air pressure under direct control of the automatic brake valve, which controls the operation of the valve in the sander line, substantially as described.

2. In an automatic track sanding apparatus, the combination with a main air reservoir, an automatic brake valve, a sander, separate pipe lines connecting the reservoir to said automatic brake valve and to said sander, of an air pressure controlled valve included in the sander pipe line, a brake cylinder pipe line, a distributing valve which controls the pressure in said brake cylinder line, and means responsive to the air pressure in said brake cylinder line which controls said valve in the sander line and opens it, as and for the purposes described.

3. In an automatic track sanding apparatus, the combination with a main air reservoir, an automatic brake valve, an independent valve, a sander, pipe means connecting said reservoir with said valves, and another pipe line connecting it to said sander, a brake cylinder pipe line, a distributing valve connected with and operating under control of said automatic brake and independent valves, which distributing valve controls the pressure in said brake cylinder line, means responsive to the air pressure in said latter line which controls said valve in the sander line, and means responsive to the operation of the independent valve which cuts the valve in the sander line out from under control of the brake cylinder line, substantially as described.

4. In an automatic air controlled track sander, a pipe line to deliver air from the main reservoir of the air brake system to the sander, a valve therein, an air pressure controlled motor for actuating said valve comprising an actuator, means to expose said actuator on one side to the main reservoir air pressure, and means to control the air pressure on the other side of the actuator by the automatic brake valve, said actuator, when the automatic brake valve is moved to set the brakes, being adapted to move said first mentioned valve to admit air to the sander.

In testimony whereof I affix my signature in presence of two witnesses.

HALSTEAD T. AYDELOTT.

Witnesses:
NOMIE WELSH,
MINNIE L. DANIEL.

---

Copies of this patent may be obtained for five cents each, by addressing the "Commissioner of Patents, Washington, D. C."